Figure 1:
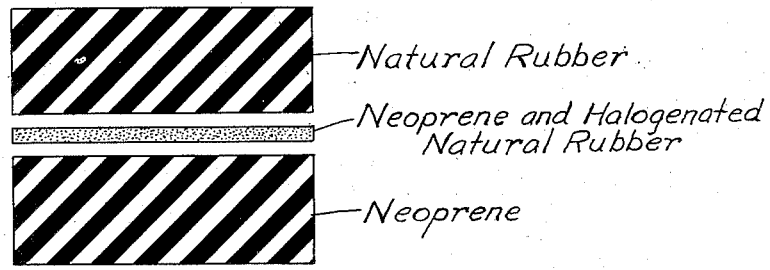

Aug. 29, 1939.　　B. J. HABGOOD ET AL　　2,170,947

MANUFACTURE OF RUBBER ARTICLES

Filed March 16, 1937

Bernard James Habgood
Leslie Budworth Morgan　　INVENTORS.

BY

Mark H. Clayton　ATTORNEY.

Patented Aug. 29, 1939

2,170,947

UNITED STATES PATENT OFFICE 2,170,947

MANUFACTURE OF RUBBER ARTICLES

Bernard James Habgood and Leslie Budworth Morgan, Blackley, Manchester, England, assignors to Imperial Chemical Industries Limited, a corporation of Great Britain Application March 16, 1937, Serial No. 131,260
In Great Britain March 18, 1936

17 Claims. (Cl. 154—2)

This invention relates to new and composite rubber articles and materials comprising vulcanised natural rubber bonded to a vulcanised synthetic rubber-like material made by polymerising halogen-substituted butadiene. It also relates to the manufacture of the said composite rubber articles and materials.

The aforesaid synthetic rubber-like materials, particularly those made by complete or partial polymerisation of 2-chlorobutadiene(1:3) for instance as described in U. S. Specification No. 1,950,432, and known to the trade as "neoprene," have certain advantages over natural rubber. For instance, they have greater resistance to oils and solvents and also to ozone, and they do not show that development of minute superficial cracks on exposure to light which is known as "sun-checking".

We have found that composite rubber articles and materials of the kind described may be made by using a bonding agent, which comprises both a halogen derivative of natural rubber as defined below and polymerised 2-chlorobutadiene(1:3), with or without natural rubber, and with compounding materials.

The process of our invention is simple to carry out, and it has the advantage that it can be effected in conjunction with the vulcanisation of the rubber and of the synthetic rubber-like material. In addition it uses inexpensive materials and produces bonds of excellent mechanical strength.

The advantage of being able to make such composite articles and materials having satisfactory bonding will be readily apparent to those skilled in the art of fabricating rubber articles and materials, since articles and materials can be made in which some parts are composed of natural rubber and other parts are composed of the synthetic rubber-like material. Thus in the manufacture of motor car tyre covers, the inner portion of the cover may be made of natural rubber and the outer layer of the synthetic rubber-like material. It will have a greater resistance to sun-checking and will also have greater resistance to oils and solvents and so be more immune from damage by accidental contact with these. Also in the manufacture of rubber rollers for printing, these can be made with an outer layer of the synthetic rubber-like material bonded to a core of natural rubber, so that the outer parts will have good resistance to the vehicles in the printing inks and to the machine oils with which they are liable to come into contact.

Our invention accordingly comprises a process for the manufacture of composite rubber articles and materials comprising vulcanised natural rubber bonded to vulcanised synthetic rubber-like material made by polymerising halogen-substituted butadiene(1:3), which comprises arranging the unvulcanised compounded natural rubber and the unvulcanised compounded said synthetic rubber-like material, with in between and in good contact with them, a bonding agent comprising both a halogen derivative of natural rubber as defined below and polymerised 2-chlorobutadiene(1:3), with or without natural rubber and with compounding materials, and then vulcanising.

By a halogen derivative of natural rubber we mean a product obtained by taking natural rubber and treating it with halogen or a substance containing halogen so that chemical interaction takes place, and a product containing halogen results. When using a halogen, the most convenient one is chlorine although bromine or another halogen may be used instead if desired. When using a substance containing halogen, hydrochloric acid is the most convenient, but other substances containing halogen may be used, for instance, hypochlorous acid, sulphuryl chloride, thionyl chloride, phosphorous oxychloride, ethyl chloroformate, ethyl hypochlorite and cyanogen bromide.

Figure 2:
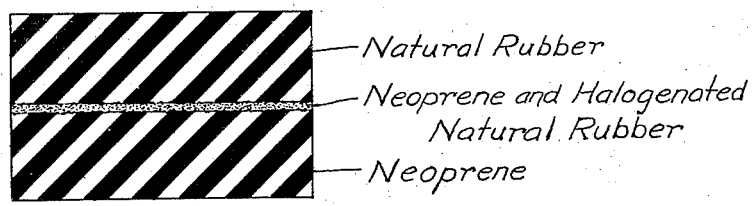

The bonding agent may be applied in between the materials to be bonded in any form which is convenient, for instance, as a suitable sheet or film. In order that the invention may be better understood, reference is made to the accompanying drawing in which Figure 1 represents a piece of uncured compounded natural rubber and a piece of uncured compounded neoprene, with interposed between them a layer of an unvulcanised compounded synthetic rubber-like material, comprising a halogen derivative of natural rubber, and polymerized 2-chlorobutadiene(1:3), preparatory to bonding the natural rubber and neoprene together. Figure 2 represents the same pieces of natural rubber and neoprene after both have been brought into good contact with the layer of material comprising a halogen derivative of natural rubber and polymerized 2-chlorobutadiene(1:3) in between them and the whole cured. The relative thicknesses of rubber, neoprene, and bonding composition are chosen only to illustrate the relation of the parts and are not intended to be construed as a limitation of the invention. In fact, the same is true, in general, for the whole drawing.

The following examples in which parts are by weight, illustrate but do not limit the invention.

EXAMPLE 1

Three mixes are made as follows:

*Natural rubber mix*

| | Parts |
|---|---|
| Smoked sheet natural rubber | 100 |
| Zinc oxide | 5.5 |
| Carbon black | 40 |
| Stearic acid | 0.3 |
| Pine tar | 2.5 |
| Sulphur | 2.5 |
| Mercaptobenzthiazole | 0.8 |

*Polymerised 2-chlorobutadiene(1:3) rubber-like material mix*

| | Parts |
|---|---|
| Neoprene | 100 |
| Light calcined magnesia | 10 |
| Zinc oxide | 10 |
| Wood rosin | 5 |
| Carbon black | 35 |
| Cottonseed oil | 3 |
| Sulphur | 1 |
| Phenyl-β-naphthylamine | 2 |

*Bonding mix*

| | Parts |
|---|---|
| Neoprene | 100 |
| Rubber hydrochloride, as made below | 100 |
| Light calcined magnesia | 10 |
| Zinc oxide | 10 |
| Stearic acid | 1 |
| Sulphur | 3 |
| Mercaptobenzthiazole | 1.25 |

The first two mixes are sheeted, the surfaces to be bonded are wetted with benzene or solvent naphtha to make them tacky, the bonding mix in the form of a thin sheet is interposed and the composite layer vulcanised in a press at 141° C. for 45 minutes.

The bonded layers cannot be torn apart except by tearing the bonding layer into two.

The rubber hydrochloride used is one which contains 7.4% of chlorine and which is made by passing hydrochloric acid gas into an 8% solution of rubber in benzene at 0° C., and then allowing to stand at room temperature 24 hours. The excess hydrochloric acid is neutralised by adding ammonia and the benzene removed by blowing steam through, and the residual product is dried on hot rolls.

EXAMPLE 2

This is as Example 1, but the halogen derivative of natural rubber, which is used, is a rubber hydrochloride which contains 11.3% of chlorine and which is made by passing hydrochloric acid gas into an 8% solution of masticated rubber in benzene at 0° C. and then allowing it to stand for 24 hours at about 10–15° C. The excess hydrochloric acid is neutralised by adding ammonia, and the benzene removed by blowing steam through, and the residual product washed and dried on hot rolls.

EXAMPLE 3

Natural rubber and polymerised 2-chlorobutadiene(1:3) rubber-like material mixes are made as described in Example 1, and a bonding mix as follows:

*Bonding mix*

| | Parts |
|---|---|
| Neoprene | 100 |
| Chlorinated rubber made as described below | 50 |
| Smoked sheet natural rubber | 60 |
| Light calcined magnesia | 10 |
| Zinc oxide | 10 |
| Stearic acid | 1 |
| Benzidine | 0.4 |
| Sulphur | 3.0 |
| Mercaptobenzthiazole | 1.25 |

The bonding is done as described in Example 1. A good bond is obtained.

The chlorinated rubber used contains 20.1% chlorine and is prepared by slowly adding the necessary quantity of a carbon tetrachloride solution of chlorine to a 6.5% solution of rubber in carbon tetrachloride while stirring at 0° C., then slowly raising the temperature of the mixture so that at the end of 2 hours the solution is boiling. The mixture is then steam distilled, and the solid residue dried on hot rolls.

EXAMPLE 4

Three mixes are made up as follows:—

*Natural rubber mix*

| | Parts |
|---|---|
| Smoked sheet natural rubber | 100 |
| Zinc oxide | 5 |
| Carbon black | 40 |
| Stearic acid | 2 |
| Pine tar | 2 |
| Sulphur | 3 |
| Mercaptobenzthiazole | 0.75 |

*Polymerised 2-chlorobutadiene(1:3) rubber-like material mix*

| | Parts |
|---|---|
| Neoprene | 100 |
| Light calcined magnesia | 10 |
| Zinc oxide | 10 |
| Wood rosin | 5 |
| Carbon black | 35 |
| Cottonseed oil | 3 |
| Sulphur | 1 |
| Phenyl-β-naphthylamine | 2 |

*Bonding mix*

| | Parts |
|---|---|
| Neoprene | 100 |
| Halogen derivative of natural rubber, as made below | 100 |
| Light calcined magnesia | 10 |
| Zinc oxide | 10 |
| Stearic acid | 1 |
| Sulphur | 2 |
| Mercaptobenzthiazole | 1.25 |

The first two mixes are sheeted, the surfaces to be bonded are wetted with benzene or solvent naphtha to make them tacky, the bonding mix in the form of a thin sheet is interposed and the composite layer vulcanised in a press at 141° C. for 45 minutes.

The bonded layers cannot be torn apart except by tearing the bonding layers into two.

The halogen derivative of natural rubber, which is used, is made as follows:

A solution of 3.06 parts of ethyl hypochlorite in 43.7 parts of benzene is added to a solution of 40 parts of masticated rubber in 437 parts of benzene and the mixture is stirred at 10° C. for 4 hours. The benzene is then removed under reduced pressure at 40–60° C. There remains a dry rubber-like material which can be worked easily on the mill.

EXAMPLE 5

This example is as Example 4, but the bonding mix is made as follows:

|  | Parts |
|---|---|
| Neoprene | 100 |
| Natural rubber | 70 |
| Halogen derivative of natural rubber, as made below | 50 |
| Light calcined magnesia | 10 |
| Zinc oxide | 10 |
| Stearic acid | 1 |
| Sulphur | 3 |
| Mercaptobenzthiazole | 0.75 |
| Wood rosin | 5 |

A good bond is obtained.

The halogen derivative of natural rubber which is used is made as follows:

12.5 parts of sulphuryl chloride are added with stirring during 30 minutes to a solution of 100 parts of natural rubber in 1093 parts of benzene, while the temperature is kept at 60° C. When the addition is complete, the mixture is heated under a reflux condenser at the boiling point for 4 hours. The mixture is then cooled, neutralised with dilute aqueous ammonia, and steam-distilled. The still residue is washed with water and dried on a hot roller mill.

EXAMPLE 6

This example is as No. 5, but the halogenated derivative of natural rubber is made as follows:

1 part of phosphorus oxychloride is added with stirring to a solution of 40 parts of natural rubber in 437 parts of benzene, while the temperature is kept at 20° C. When the addition is complete, the mixture is heated at 40° C. for 3 hours. The mixture is then cooled, neutralised with dilute aqueous ammonia and steam-distilled. The still residue is washed with water and dried on a hot roller mill. The dry substance is a soft rubbery mass easily worked on the mill.

EXAMPLE 7

This example is as No. 5, but the halogenated derivative of natural rubber is made as follows:

25 parts of thionyl chloride are added with stirring during 30 minutes to a solution of 100 parts of rubber in 1093 parts of benzene while the temperature is kept at 60° C. When the addition is complete the mixture is heated at the boiling point under a reflux condenser for 3–4 hours. The mixture is then cooled, neutralised with dilute aqueous ammonia and steam-distilled. The still residue is washed with water and dried on a hot rubber roll. The product is a slightly sticky rubbery material.

EXAMPLE 8

This example is as No. 5, but the halogenated derivative of natural rubber is made as follows:

40 parts of sulphur chloride are added rapidly at ordinary temperature to a solution of 40 parts of rubber in 440 parts of benzene which is kept vigorously stirred. The resulting gel is broken up and neutralised by adding dilute aqueous ammonia and leaving to stand in aqueous contact with this for 24 hours. The mixture is then steam-distilled, and the still residue washed with water and dried on a hot roller mill. The dry substance rapidly powders on the mill but disperses well in polymerised 2-chlorobutadiene (1:3) and rubber.

EXAMPLE 9

This example is as Example 4, but the halogenated derivative of natural rubber is made as follows:

Rubber latex containing 100 parts of rubber is reacted with 16.4 parts of hypochlorous acid in the manner described by Bloomfield and Farmer, Jour. Soc. Chem. Ind. 1934, 53, 43T.

The product is a white fibrous material resembling in appearance precipitated gutta-percha.

EXAMPLE 10

This example is as Example 4, but the halogenated derivative of natural rubber is made as follows:

A solution of 36 parts of bromine in 160 parts of carbon tetrachloride is added during 30 minutes with stirring, at 0° C., to a solution of 30 parts of natural rubber in 480 parts of tetrachloride at 0° C. The temperature is then raised to boiling point in about 3 hours. The brominated product is isolated as described in Example 5.

EXAMPLE 11

This example is as Example 4, but the halogenated derivative of natural rubber is made as follows:

37 parts of cyanogen bromide are gradually added at room temperature during 30 minutes, to a solution of 60 parts of natural rubber in 650 parts of benzene. The mixture is stirred at room temperature for 18 hours and the product worked up as described in Example 5. The product is a soft rubbery thermoplastic mass.

EXAMPLE 12

This example is as No. 5, but the halogenated derivative of natural rubber is made as follows:

25 parts of ethyl chloroformate are added with stirring during 30 minutes to a solution of 100 parts of natural rubber in 1093 parts of benzene, while the temperature is kept at 60° C. When the addition is complete, the mixture is heated under a reflux condenser at the boiling point for 4 hours. The mixture is then cooled, neutralised with dilute aqueous ammonia and steam-distilled. The still residue is washed with water and dried on a hot roller mill. The dry substance is a soft rubbery mass.

EXAMPLE 13

This is similar to Example 2, but the bonding mix is made as follows:

Bonding mix

|  | Parts |
|---|---|
| Polymerised 2-chlorobutadiene(1:3) | 100 |
| Chlorinated rubber made as described below | 100 |
| Light calcined magnesia | 10 |
| Zinc oxide | 10 |
| Stearic acid | 1 |
| Sulphur | 3 |
| Mercaptobenzthiazole | 1.25 |

The chlorinated rubber is one containing 4.5% of chlorine and is made by slowly adding a carbon tetrachloride solution containing 12.2 parts of chlorine to 100 parts of rubber dissolved in 1700 parts of carbon tetrachloride while stirring at 0° C., then slowly raising the temperature of the mixture so that at the end of 2 hours the solution is boiling. The mixture is then steam blown and the solid residue washed and dried on hot rolls.

We claim:

1. A process for the manufacture of composite rubber articles and materials comprising vulcanized natural rubber bonded to a vulcanized synthetic rubber-like material made by polymerizing halogen-substituted butadiene(1:3), which comprises taking unvulcanized compounded natural rubber and unvulcanized compounded synthetic rubber-like material made by polymerizing halogen-substituted butadiene(1:3) along with an interposed unvulcanized compounded synthetic rubber-like material comprising a halogen derivative of natural rubber and polymerized 2-chlorobutadiene(1:3), bringing the materials into good contact and then vulcanizing.

2. A process for the manufacture of composite rubber articles and materials comprising vulcanized natural rubber bonded to a vulcanized synthetic rubber-like material made by polymerizing 2-chlorobutadiene(1:3), which comprises taking unvulcanized compounded natural rubber and unvulcanized compounded synthetic rubber-like material made by polymerizing 2-chlorobutadiene(1:3) along with an interposed unvulcanized compounded synthetic rubber-like material comprising a halogen derivative of natural rubber and polymerized 2-chlorobutadiene(1:3), bringing the materials into good contact and then vulcanizing.

3. A process for the manufacture of composite rubber articles and materials comprising vulcanized natural rubber bonded to a vulcanized synthetic rubber-like material made by polymerizing 2-chlorobutadiene(1:3), which comprises taking unvulcanized compounded natural rubber and unvulcanized compounded synthetic rubber-like material made by polymerizing 2-chlorobutadiene(1:3) along with an interposed unvulcanized compounded synthetic rubber-like material comprising a chloro derivative of natural rubber and polymerized 2-chlorobutadiene(1:3), bringing the materials into good contact and then vulcanizing.

4. A process for the manufacture of composite rubber articles and materials comprising vulcanized natural rubber bonded to a vulcanized synthetic rubber-like material made by polymerizing 2-chlorobutadiene(1:3), which comprises taking unvulcanized compounded natural rubber and unvulcanized compounded synthetic rubber-like material made by polymerizing 2-chlorobutadiene(1:3) along with an interposed unvulcanized compounded synthetic rubber-like material comprising rubber hydrochloride and polymerized 2-chlorobutadiene(1:3), bringing the materials into good contact and then vulcanizing.

5. A process as described in claim 3, further characterized in that the surfaces to be bonded are wetted with a solvent to make them tacky when they are brought together.

6. Composite rubber articles and materials comprising vulcanized natural rubber, vulcanized synthetic rubber-like material made by polymerizing halogen-substituted butadiene(1:3) and a bond of vulcanized material comprising a halogen derivative of natural rubber and polymerized 2-chlorobutadiene(1:3).

7. Composite rubber articles and materials comprising vulcanized natural rubber, vulcanized synthetic rubber-like material made by polymerizing 2-chlorobutadiene(1:3) and a bond of vulcanized material comprising a halogen derivative of natural rubber and polymerized 2-chlorobutadiene(1:3).

8. Composite rubber articles and materials comprising vulcanized natural rubber, vulcanized synthetic rubber-like material made by polymerizing 2-chlorobutadiene(1:3) and a bond of vulcanized material comprising a chloro derivative of natural rubber and polymerized 2-chlorobutadiene(1:3).

9. Composite rubber articles and materials comprising vulcanized natural rubber, vulcanized synthetic rubber-like material made by polymerizing 2-chlorobutadiene(1:3) and a bond of vulcanized material comprising rubber hydrochloride and polymerized 2-chlorobutadiene(1:3).

10. A product as described in claim 8, further characterized in that the bond contains as a compounding ingredient natural rubber.

11. A process as described in claim 4, further characterized in that the rubber hydrochloride contains about 11.3% of chlorine.

12. A product as described in claim 9, further characterized in that the rubber hydrochloride contains about 11.3% of chlorine.

13. A process as described in claim 4, further characterized in that the interposed synthetic rubber-like material comprises about equal proportions of polymerized 2-chlorobutadiene(1:3) and rubber hydrochloride containing about 11.3% of chlorine, and in that the surfaces to be bonded are wetted with a solvent to make them tacky when they are brought together.

14. A product as described in claim 9, further characterized in that the bond of vulcanized material comprises about equal proportions of polymerized 2-chlorobutadiene(1:3) and rubber hydrochloride containing about 11.3% of chlorine.

15. A process as described in claim 3, further characterized in that the interposed synthetic rubber-like material comprises about equal proportions of polymerized 2-chlorobutadiene(1:3) and chlorinated rubber containing about 4.5% of chlorine and in that the surfaces to be bonded are wetted with a solvent to make them tacky when they are brought together.

16. A product as described in claim 9, further characterized in that the bond of vulcanized material comprises about equal proportions of polymerized 2-chlorobutadiene(1:3) and chlorinated rubber containing about 4.5% of chlorine.

17. A product as described in claim 7, further characterized in that the bond contains as a compounding ingredient natural rubber.

BERNARD JAMES HABGOOD.
LESLIE BUDWORTH MORGAN.

CERTIFICATE OF CORRECTION.

Patent No. 2,170,947.  August 29, 1939.

BERNARD JAMES HABGOOD, ET AL.

It is hereby certified that error appears in the printed specification of the above numbered patent requiring correction as follows: Page 1, second column, line 20, for "halogan" read halogen; page 2, second column, line 58, in the table, for "Sulphur---------------------------- 2" read Sulphur---------------------------- 3; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.